(12) United States Patent
Lindner et al.

(10) Patent No.: US 6,923,304 B2
(45) Date of Patent: Aug. 2, 2005

(54) PRESSURE PLATE ASSEMBLY

(75) Inventors: Joachim Lindner, Dittelbrunn (DE); Reinhold Weidinger, Unterspiesheim (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/610,992

(22) Filed: Jul. 1, 2003

(65) Prior Publication Data

US 2004/0026206 A1 Feb. 12, 2004

(30) Foreign Application Priority Data

Aug. 10, 2002 (DE) .......................................... 102 36 832

(51) Int. Cl.$^7$ .............................................. F16D 13/75
(52) U.S. Cl. ................................ 192/70.25; 192/111 A
(58) Field of Search ........................... 192/70.25, 111 A

(56) References Cited

U.S. PATENT DOCUMENTS

| 4,207,972 A | 6/1980 | Zeidler |
| 6,186,302 B1 | 2/2001 | Drexl et al. |
| 2002/0040837 A1 * | 4/2002 | Dobler et al. ............ 192/70.25 |
| 2002/0043439 A1 * | 4/2002 | Gorzitzke et al. ........ 192/70.25 |
| 2002/0079187 A1 * | 6/2002 | Weidinger et al. ....... 192/70.25 |

FOREIGN PATENT DOCUMENTS

DE        196 51 633        8/1998

* cited by examiner

*Primary Examiner*—Rodney H. Bonck
(74) *Attorney, Agent, or Firm*—Cohen, Pontani, Lieberman & Pavane

(57) ABSTRACT

A wear take-up device in the path of force transmission between the pressure plate and the force-exerting arrangement includes at least one take-up element, which can be shifted to compensate for wear; a blocking element with a detection section which can come to rest against a stop fixed to the housing upon the occurrence of wear and which can move with respect to the pressure plate; and a wedge-like arresting element, which is pretensioned by a pretensioning arrangement toward a state in which the detection section is arrested and thus prevented from returning to its previous position. A retaining device opposes the pretensioning action of the pretensioning arrangement at least under the conditions in which the detection section has essentially not been moved out of an arrested position with respect to the pressure plate.

7 Claims, 5 Drawing Sheets

PRESSURE PLATE ASSEMBLY

BACKGROUND OF THE INVENTION

1. Field of the Invention

The present invention pertains to a pressure plate assembly comprising a housing arrangement; a pressure plate mounted in the housing arrangement with freedom of movement in a direction parallel to the axis of rotation; and a force-exerting arrangement, preferably a force storage device, supported against the housing arrangement and the pressure plate. A wear take-up device in the path of force transmission between the pressure plate and the force-exerting arrangement includes at least one take-up element which can be shifted to compensate for wear; a blocking element on the pressure plate with a detecting section which can come to rest against a stop upon the occurrence of wear and which is able to move with respect to the pressure plate; and a wedge-like arresting element, which arrests the blocking element and thus prevents it from returning to its previous position after it has moved with respect to the pressure plate. The arresting element is pretensioned by a pretensioning arrangement in the direction toward a state in which it prevents the blocking element from returning to its previous position.

2. Description of the Related Art

In pressure plate assemblies of this type, the arresting action of the arresting element is usually achieved by a pretensioning effect, usually produced by a pretensioning spring, which pretensions the element into an intermediate space formed between the blocking element and the pressure plate. This intermediate space increases in size as the amount of wear increases, and the wedge-like arresting element can thus shift correspondingly and move continuously farther into this space. The pretensioning effect which tries to push the arresting element into the intermediate space indicated, however, also exerts a force on the blocking element, namely, a force which tries to shift it in the same direction as that in which it would move with respect to the pressure plate after the occurrence of wear. If such a shift of position were to occur, this could cause the take-up element, at least one of which is present, to execute a wear-compensating or wear take-up movement even though no wear has occurred. To prevent this, the blocking element, which is usually designed as a leaf spring, can be provided with an intrinsic pretensioning force strong enough to prevent the arresting element from causing this type of undesirable movement(of the blocking element. Providing the blocking element with enough stiffness to accomplish the end result, however, leads to the problem that, after it has made contact with the stop, the blocking element must be deformed in opposition to its intrinsic stiffness. This type of actuation of the blocking element usually occurs during the clutch-engaging operation, but because of the stiffness of the element, a force acting in opposition to the displacement of the pressure plate, which carries the blocking element, is generated.

SUMMARY OF THE INVENTION

The task of the present invention is to provide a pressure plate assembly in which, without any influence on the operating characteristics of the clutch, the occurrence of unwanted wear take-up can be avoided.

According to the present invention, this task is accomplished by a pressure plate assembly comprising a housing arrangement; a pressure plate, mounted in the housing arrangement with freedom to move in a direction parallel to the axis of rotation; a force-exerting arrangement, preferably a force storage device, which is supported against the housing arrangement and the pressure plate; a wear take-up device in the path of force transmission between the pressure plate and the force-exerting arrangement, this wear take-up device comprising at least one take-up element, which can shift to compensate for wear; a blocking element on the pressure plate with a detecting section which can come to rest against a stop upon the occurrence of wear and which can be moved with respect to the pressure plate; a wedge-like arresting element, which arrests the blocking element and thus prevents it from returning to its previous position after it has moved with respect to the pressure plate, where the arresting element is pretensioned by a pretensioning arrangement toward a state in which it prevents the blocking element from returning to its previous position; and a retaining arrangement, which opposes the pretensioning effect of the pretensioning arrangement at least in a state in which the blocking element has essentially not been moved out of an arresting-element-arrested position with respect to the pressure plate.

In addition, therefore, the pressure plate assembly according to the invention also has a retaining device, which ensures that, when there is no wear-induced deflection or movement of the blocking element with respect to the pressure plate, that is, when this element is to be held, for example, by the action of the arresting element in a position with respect to the pressure plate which is essentially constant, a force acting in opposition to the pretensioning arrangement is produced, so that the arresting element cannot generate any force at all or only a comparatively weak force of the type which tries to move the blocking element in the same way as it would upon the occurrence of wear. Only after the detection section has made contact with the stop and has thus actually been moved or deflected with respect to the pressure plate is it possible—now that the effect of the retaining arrangement has been nullified or reduced—for the arresting element to respond to the pretensioning action of the pretensioning arrangement and again ensure that the blocking element cannot return to its previous position.

For example, the retaining arrangement can oppose the pretensioning effect by means of a positive engagement. This can be realized in that the retaining arrangement comprises a set of graduated steps along a tapering wedge area on the arresting element, and in that these retaining steps on the arresting element can come into contact with the detection section. Whenever, as a result of wear, the detection section is deflected to such an extent that it moves above a retaining step, the retaining action of the retaining arrangement is briefly nullified and the arresting element can move until the next retaining step comes to rest against the detection section.

In an alternative embodiment, the positively engaging effect can be achieved in that the arresting element has a set of teeth on the area where it is supported on the pressure plate, and in that a set of opposing teeth is provided on the pressure plate or on a part supported thereon; this opposing set of teeth can be brought into engagement with the first set of teeth. Therefore, whenever the detection section moves with respect to the pressure plate as a result of the occurrence of wear and thus releases the arresting element, the pretensioning effect of the pretensioning arrangement ensures that the two sets of teeth will disengage from each other briefly, so that the arresting element can move into a state in which it again reliably prevents the detection section from returning to its previous position.

According to another alternative embodiment, it can be provided that the retaining arrangement opposes the pretensioning effect by frictional engagement. This can be realized, for example, by providing a groove, which accepts the arresting element, in the pressure plate. The arresting element engages frictionally in this groove, at least when it is in the arresting state. The advantage of this embodiment is that it makes possible a continuous and therefore infinitely variable movement of the arresting element upon the occurrence of wear and accordingly an infinitely variable adjustment of the position of the detection section with respect to the pressure plate. The frictional engagement effect can be advantageously achieved by designing the groove so that it tapers down toward its base.

In the pressure plate assembly according to the invention, the blocking element can be designed with a body section in the form of a leaf spring, which is attached to the pressure plate. A detection section, which can make contact with a stop, extends from this body section. The arresting element works together with this detection section of the blocking element.

The present invention also pertains to a friction clutch which comprises a pressure plate according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
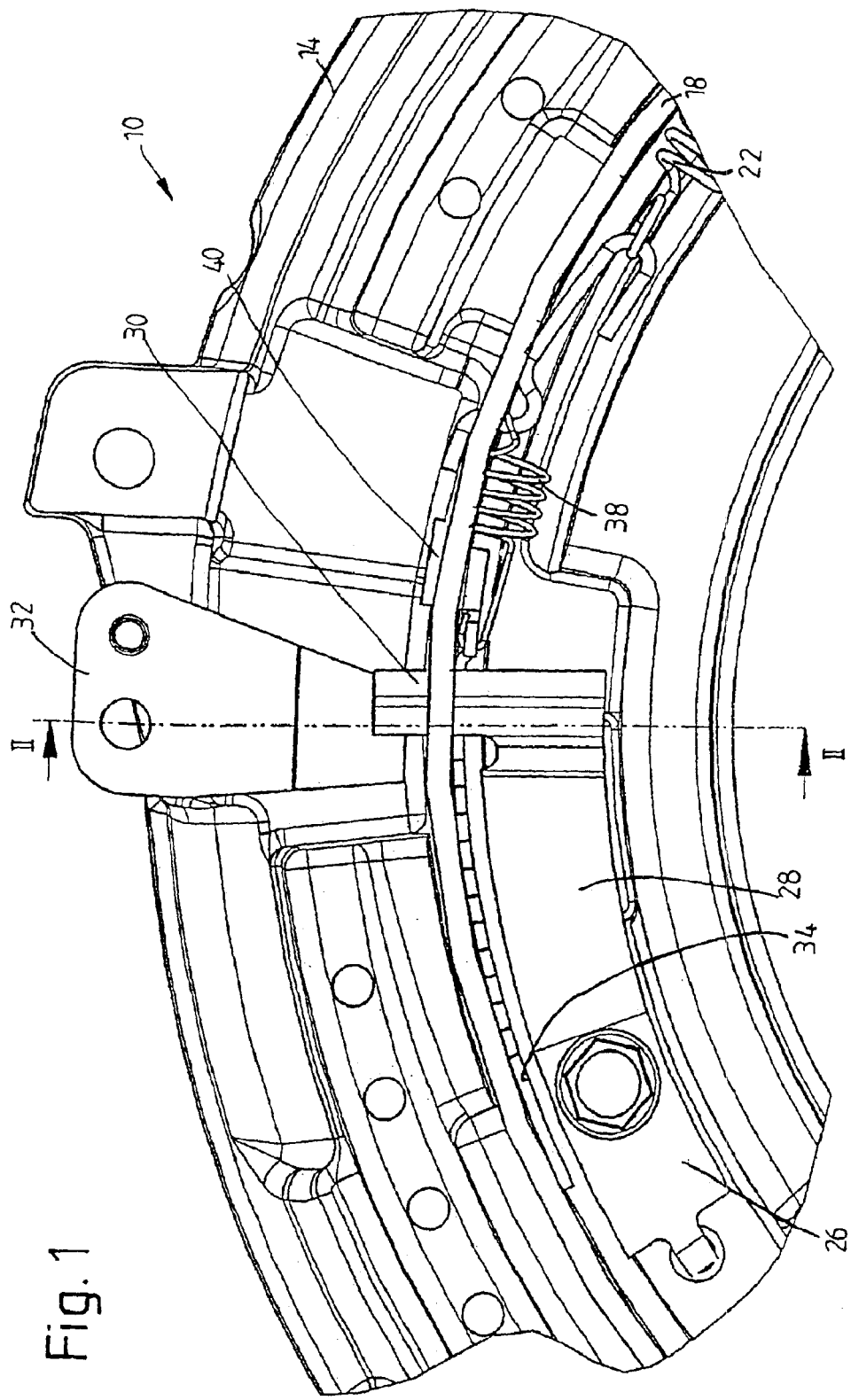
FIG. 1 shows a partial axial view of the essential components of a pressure plate assembly according to the invention.
Figure 2:
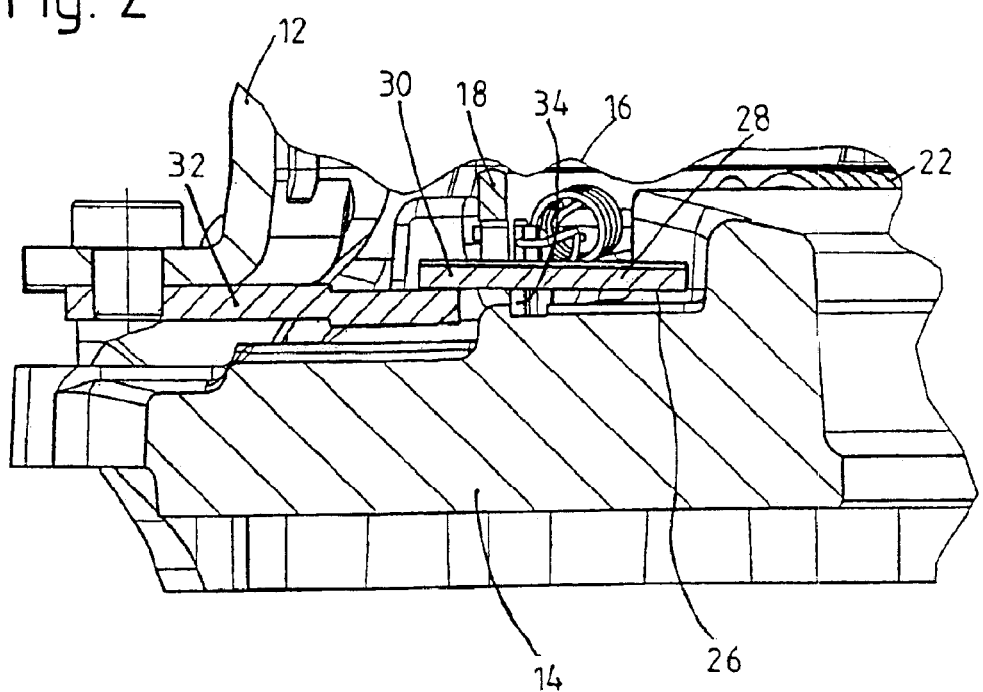
FIG. 2 shows a cross-sectional view of the pressure plate shown in FIG. 1, which has been sectioned along line II—II.
Figure 3:
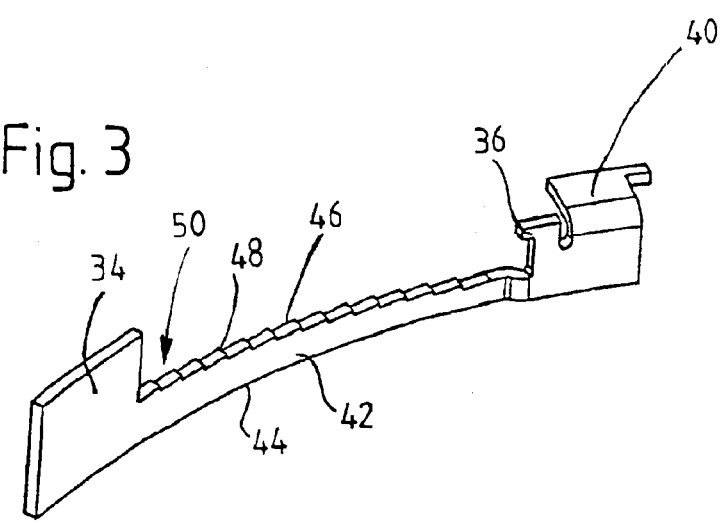
FIG. 3 shows an arresting element in the form of a wedge-shaped slider, used in the pressure plate according to FIGS. 1 and 2.

FIGS. 1–3 show a first embodiment of a pressure plate assembly 10 according to the invention. This comprises a housing arrangement 12, which can be connected nonrotatably to, for example, a flywheel or some other similar type of component, shown only schematically in FIG. 2. Mounted in the housing arrangement 12 is a pressure plate 14, which is held by, for example, a plurality of tangential leaf springs or the like so that it has the freedom to move in a direction parallel to the axis of rotation, which is perpendicular to the plane of the drawing in FIG. 1, but is essentially prevented from rotating with respect to the housing arrangement 12. A force-exerting arrangement such as a force storage device (not shown) is supported against the housing arrangement on one side and against the pressure plate 14 on the other and thus tries to push the pressure plate 14 out of the housing arrangement 12 and toward a flywheel (not shown). The force-exerting arrangement is supported with respect to the pressure plate 14 by a wear take-up device 16, which, in the example shown, comprises a wear take-up ring 18. The take-up ring 18 is acted upon by the force storage device or by some other type of force-exerting arrangement, such as a lever assembly or the like. The take-up ring 18 is pretensioned by a spring 22 for rotation with respect to the pressure plate 14, where the surfaces of the take-up ring 18 and of the pressure plate 14 which face each other are provided with wedge-like or ramp-like formations, so that a relative rotation of the two components 18, 14 leads to an increase in the axial dimension of the wear take-up device 16, comprising essentially the take-up ring 18. It is obvious that the wear take-up device 16 could also comprise two take-up rings, which can rotate with respect to each other and are pretensioned to rotate with respect to each other, these rings thus having the wedge-like or ramp-like surfaces on their facing surfaces.

A blocking element 26 is attached to the pressure plate 14. This element has a body section 28, which extends approximately in the circumferential direction and has an end area by which it is attached to the pressure plate 14. At its free end, a detection section 30 projects laterally from the body section 28; in the example shown here, it projects radially toward the outside. Because the body section 28 is located radially inside the wear take-up device 16, the detection section 30 passes through an opening formed in the take-up ring 18, it being ensured that, even when the take-up ring 18 rotates circumferentially, it will never make contact with the blocking/detection section 30. The radially outer end of the detection section 30 extends over a plate-like stop 32 attached to the housing arrangement 12, so that, as can be seen in FIG. 2, a certain overlap is present here in the radial direction and in the circumferential direction.

A wedge-like arresting slide 34, furthermore, shown in detail in FIG. 3, is arranged in such a way that it rests against the inner circumferential side of the take-up ring 18 and thus can be supported against it radially toward the outside. A pretensioning spring 38 has one end hooked onto a hook section 36 of the arresting slide and an opposite end supported by the spring 22, i.e., by the take-up ring 18, which spring 22 tries to rotate. The arresting slide 34 has a blocking section 40, which passes through an opening in the take-up ring 18 with comparatively little circumferential play.

In its central area, the arresting slide 34 has a wedge-like tapering section 42. The wedge form of this section 42 is produced essentially by a bottom side 44, which is supported on the pressure plate 14 and is essentially flat, and by a top side 46 of this section, which axially approaches the bottom side 44, which cooperates with the detection section 30, as will be described in the following. It can be seen in particular in FIG. 3 that the top side 46 of the wedge section 42 of the arresting slide 34 is graduated and thus forms a plurality of retaining steps 48.

The way in which the pressure plate assembly 10 described above operates upon the performance of a wear take-up process will be described in detail in the following.

When, for example, wear has occurred in the area of the friction linings of a clutch disk, the pressure plate 14 moves closer to the flywheel when in the engaged position, which means in FIG. 2 that, with respect to the housing arrangement 12, the pressure plate 14 is pushed farther down. Once a sufficient amount of wear has occurred, the detection section 30 comes in contact with the stop 32, so that the area of the detection section 30 of the blocking element 26 can no longer accompany the further displacement of the pressure plate 14 caused by wear. A certain part of the blocking element 26 is therefore deflected with respect to the pressure plate 14 in opposition to its own pretensioning force. One of the retaining steps 48—these steps forming an essential component of a retaining arrangement designated 50 overall—of the arresting slide 34, which is under the circumferential pretension of the spring 38, is still in circumferential contact with the detection section 30 in this initial phase and is thus prevented from moving in the circumferential direction. Because the contact surface formed between a retaining step 48 and the detection section 30 is approximately perpendicular to the direction in which the force of the spring 38 acts, the arresting slide 34 exerts essentially only a circumferential force on the blocking element 26 and exerts no force on this element which would try to push the detection section 30 away from the pressure plate 14. These force relationships persist until the area of the force/detection section 30 of the blocking element 26 has been shifted so far away from the pressure plate 14, i.e., away from the arresting slide 34, that it escapes from the retaining step 48 which was in effect until then. While the retaining effect of the retaining arrangement 50 is nullified in the circumferential direction, the arresting slide 34 can shift under the pretensioning effect of the spring 38 until the next retaining step 48 comes to rest against the detection section 30. In this state, a thicker piece of the arresting slide 34 is now located between the detection section 30 and the pressure plate 14, which means that, when the next clutch-release operation is performed, during which the detection section 30 moves away again from the stop 32, the blocking element 26 is arrested and prevented from moving back to its previous starting position. During this clutch-release operation, the force-exerting arrangement simultaneously releases the load on the take-up ring 18, so that this ring is now able to move slightly in the circumferential direction under the action of the pretensioning spring 22 until it comes to rest again against the blocking section 40 of the arresting slide 34. The extent of this circumferential movement of the take-up ring 18 and thus the associated extent of the axial movement of the take-up ring 18 corresponds to the extent of the previously completed circumferential movement of the arresting slide 34, which is associated in turn with the extent of the deflection of the detection section 30 and thus with the amount of wear which has occurred in the friction clutch. The process described above is repeated upon the execution of clutch-engaging and clutch-releasing operations whenever the friction clutch has undergone a sufficient amount of wear.

Figure 4:
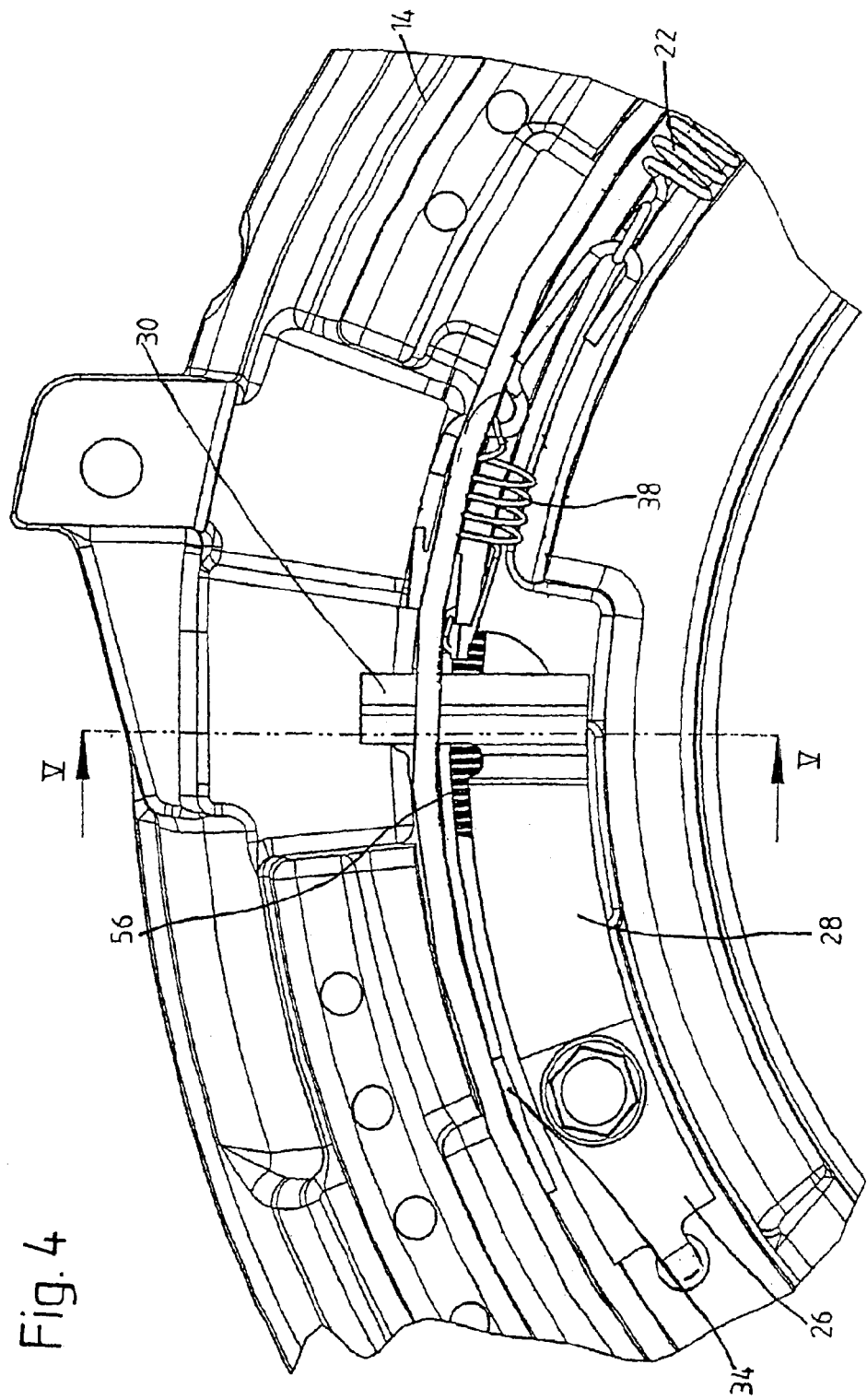
FIG. 4 shows view, similar to that of FIG. 1, of an alternative embodiment of the pressure plate according to the invention.
Figure 5:
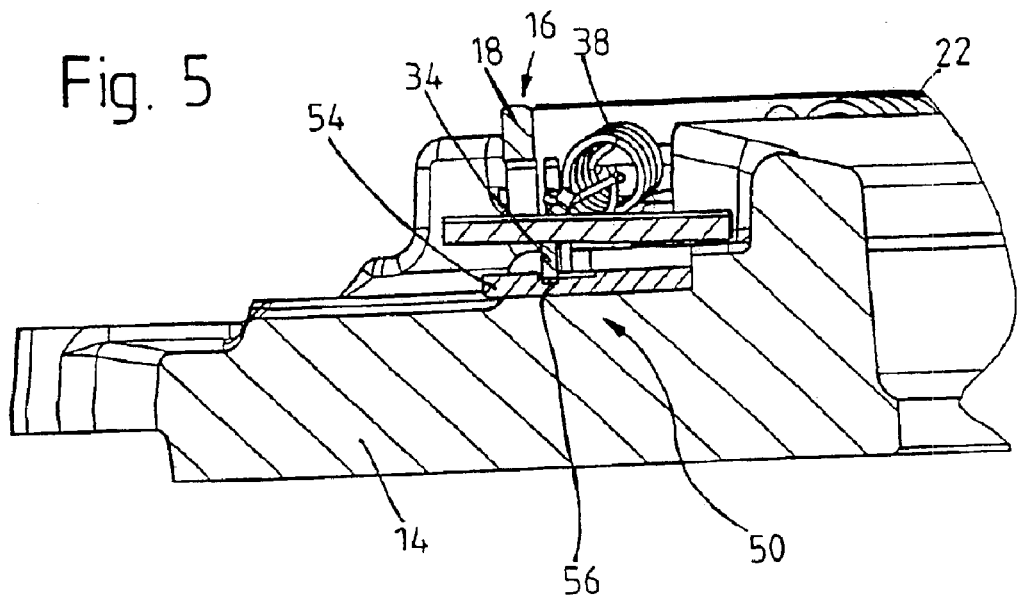
FIG. 5 shows a cross-sectional view of the pressure plate assembly shown in FIG. 4, which has been sectioned along line V—V in FIG. 4.
Figure 6:
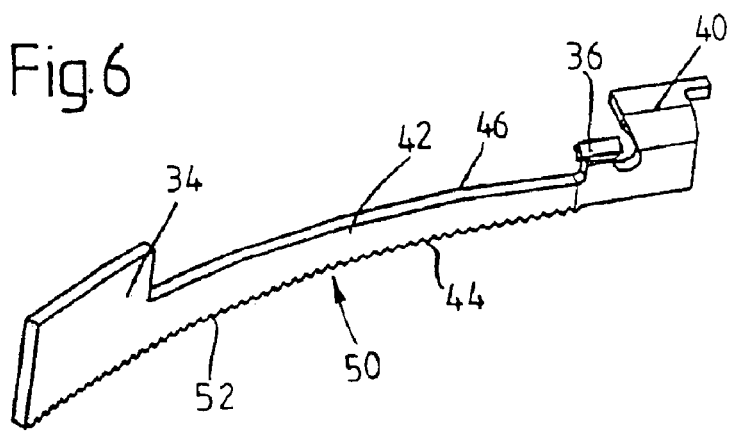
FIG. 6 shows the sliding wedge-like arresting element used in the embodiment of FIG. 4.

An alternative embodiment of a pressure plate assembly according to the invention is illustrated in FIGS. 4–6. In this embodiment, the retaining arrangement 50 comprises, first, a set of teeth 52 on the side 44 of the arresting slide 34 supported on the pressure plate 14 and, second, an opposing set of teeth 56 on the pressure plate 14 or on a support part 54 provided or carried on the pressure plate. As a result of the pretensioning effect of the pretensioning spring 38, the arresting slide 34 is pulled in the manner of a wedge into the intermediate space between the detection section 30 and the support 54 or the pressure plate 14, so that here a type of clamping effect is produced, by means of which the set of teeth 52 is brought forcibly into engagement with the opposing set of teeth 56. As a result of the engagement effect produced in the area of the sets of teeth 52, 56, a positive engagement which prevents the arresting slide 34 from moving in the circumferential direction is produced. Only after wear has occurred and the detection section 30 is able escape from or to release the arresting slide 34, is it possible, under the pretensioning action of the spring 38, for the teeth or the flanks of the teeth of the sets of teeth 52, 56 to slide over each other and for the arresting slide to shift until its side 46 comes to rest against the detection section. In a corresponding manner, the take-up ring 18 can continue to turn in the circumferential direction during a clutch-release operation until it comes to rest against the blocking section 40.

In the embodiment shown in FIGS. 4–6, it must be remembered that the flank angle of the sets of teeth 52, 56 or of at least one of these sets of teeth must be greater than the friction angle; that is, the force exerted by the restoring spring 38 in the circumferential direction must be able to make the two sets of teeth slide over each other. A configuration with steeper-flanks is also possible in principle, but in this case advantage must be taken of axial vibrations to disconnect the engagement between the sets of teeth. In this embodiment, furthermore, it is possible under certain conditions to omit the spring 22, which causes the take-up ring 18 to rotate. The take-up ring can be prevented from returning in the other direction simply by the effect of the two sets of teeth 52, 56. The direction in which the take-up ring rotates is predetermined by the direction in which the arresting slide 34 moves, which cooperates with the ring in the area of the blocking section 40.

In the embodiments described above, it can be seen that the wear is taken up in a step-like manner, because the arresting slide, which defines the take-up movements of the take-up ring 18, moves incrementally upon the occurrence of wear. That is, it can move either in correspondence with the circumferential distance between two retaining steps 48 of the arresting slide 34 according to FIG. 3, or in correspondence with the distance between two adjacent teeth in the case of the arresting slide 34 of FIG. 6.

Figure 7:
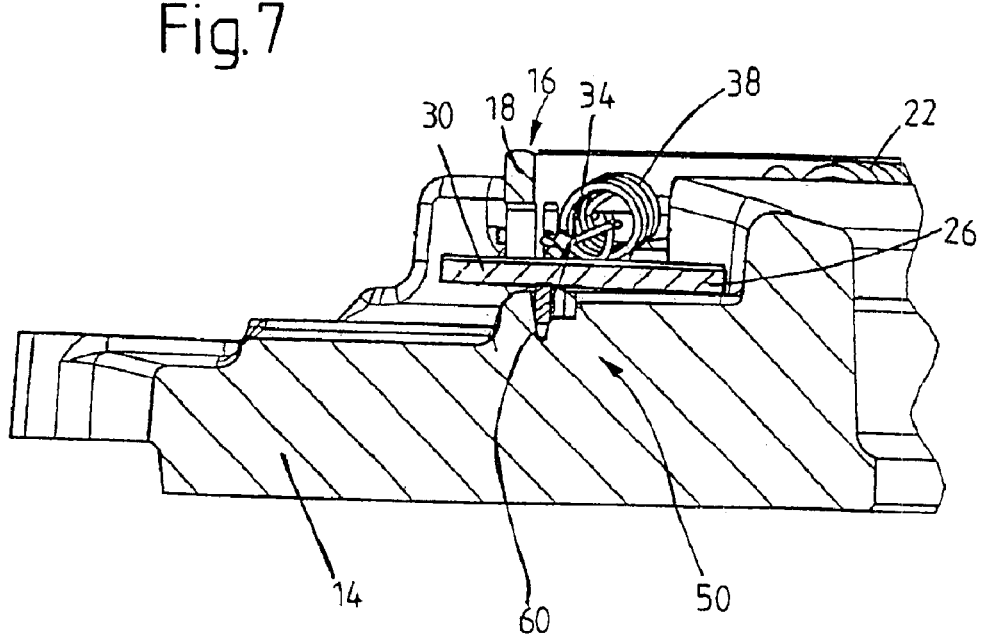
FIG. 7 shows a view, similar to that of FIGS. 2 and 5, of another alternative pressure plate assembly.

FIG. 7 shows an embodiment in which, despite the presence of a retaining arrangement 50, a continuous, that is, infinitely variable, displacement of the arresting slide 34 is made possible. It can be seen in FIG. 7 that a groove or recess 60 is provided in the pressure plate 14; this groove accepts the arresting slide 34 and/or guides it in the circumferential direction; in the exemplary embodiment shown, the groove tapers down toward its base. Of course, this groove 60 could be provided in an additional insert or support part. As a result of the pretensioning effect of the spring 38, the arresting slide 34 is pulled into the intermediate space formed between the detection section 30 and the pressure plate 14, so that, as a result of the wedge shape of the arresting slide 34, which here does not need to have either teeth or steps or the like, a force is produced which presses the slide into the groove 60. The arresting slide 34 is therefore held in a friction-locking manner in the groove 60, so that a retaining force opposing the pretensioning force of the spring 38 is generated, and the force exerted by the arresting slide 34 on the detection section is decreased correspondingly. When the detection section 30 comes up against the stop 32 shown in FIG. 1, the arresting slide 34 is released and can now respond to the pretensioning force of the spring 38 by moving in the circumferential direction while the blocking/detection section 30 is being displaced. As a result, the blocking element 26 is arrested again and prevented from moving back to its previous position with respect to the pressure plate 14. Here, too, it is advantageous for the wedge angle formed by the tapering groove 60 to be greater than the friction angle, because otherwise a self-locking effect could be created. Of course, it is also possible here to design the arresting slide 34 with a similar type of wedge shape.

Various possibilities have been described above by which a retaining arrangement can be used to ensure that, under conditions in which the blocking element is not being actively displaced with respect to the pressure plate, the pretensioning effect of a pretensioning spring acting on the arresting element or the arresting slide is at least partially compensated. Only after the blocking element has been deflected to a certain extent from this type of starting condition, that is, deflected beyond a certain distance, is the retaining effect of the retaining arrangement nullified, whereupon it is possible for the arresting element to shift in the circumferential direction.

It is obvious that the pressure plate assembly described above can be designed differently in various areas. For example, the take-up ring 18 can be prevented from rotating directly by the blocking/detection element. For this purpose, this element can extend over the take-up ring 18, so that the take-up ring 18 is clamped between the blocking/detection section and the pressure plate 14. When wear occurs, the detection section 30 moves away from the take-up ring 18 or stops exerting force on it, so that now, for example, the take-up ring 18 can rotate in the circumferential direction until it comes up against the detection section 30 again. In this case, the blocking section 40 is not required on the arresting slide 34.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A pressure plate assembly for use with a friction clutch, said pressure plate assembly comprising:

a housing having an axis of rotation;

a stop fixed to said housing;

a pressure plate mounted in the housing arrangement with freedom to move in a direction parallel to an axis of rotation;

a force-exerting arrangement which urges the pressure plate axially away from the housing arrangement along a path of force transmission;

a wear take-up device in the path of force transmission between the pressure plate and the force-exerting arrangement, comprising a take-up element which can shift to compensate for wear of said friction clutch;

a blocking element attached to the pressure plate and having a detection section which, upon the occurrence of wear of said friction clutch, comes to rest against said stop and can deflect axially with respect to the pressure plate;

an arresting element, which is movable in a direction to arrest the detection section in an arrested position after it has deflected with respect to the pressure plate, said arresting element having a blocking section against which said take-up element can come to rest after shifting;

a pretensioning arrangement which urges said arresting element in said direction so that said blocking element remains in said arrested position; and a retaining arrangement which opposes further movement of said arresting element in said direction by positively engaging said detection section while said detection section is in said arrested position.

2. A pressure plate assembly as in claim 1 wherein said arresting element comprises a wedge section having a top side provided with retaining steps which can positively engages the detection section.

3. A pressure plate assembly as in claim 1 wherein the arresting element comprises a wedge section having a bottom side supported on the pressure plate, said bottom side having a first set of teeth, said pressure plate having thereon a second set of teeth which engage said first set off teeth.

4. A pressure plate assembly as in claim 1 wherein the blocking element has a body section, which acts as a leaf spring and is attached to the pressure plate, from which said detection section extends, which can come to rest against the stop.

5. A friction clutch comprising a pressure plate assembly, said pressure plate assembly comprising:

a housing having an axis of rotation;

a stop fixed to said housing;

a pressure plate mounted in the housing arrangement with freedom to move in a direction parallel to an axis of rotation;

a force-exerting arrangement which urges the pressure plate axially away from the housing arrangement along a path of force transmission;

a wear take-up device in the path of force transmission between the pressure plate and the force-exerting arrangement, comprising a take-up element which can shift to compensate for wear of said friction clutch;

a blocking element attached to the pressure plate and having a detection section which, upon the occurrence of wear of said friction clutch, comes to rest against said stop and can deflect axially with respect to the pressure plate;

an arresting element, which is movable in a direction to arrest the detection section in an arrested position after it has deflected with respect to the pressure plate, said arresting element having a blocking section against which said take-up element can come to rest after shifting;

a pretensioning arrangement which urges said arresting element in said direction so that said blocking element remains in said arrested position; and a retaining arrangement which opposes further movement of said arresting element in said direction by positively engaging said detection section while said detection section is in said arrested position.

6. A pressure plate assembly for use with a friction clutch, said pressure plate assembly comprising:

a housing having an axis of rotation;

a stop fixed to said housing;

a pressure plate mounted in the housing arrangement with freedom to move in a direction parallel to an axis of rotation;

a force-exerting arrangement which urges the pressure plate axially away from the housing arrangement along a path of force transmission;

a wear take-up device in the path of force transmission between the pressure plate and the force-exerting arrangement, comprising a take-up element which can shift to compensate for wear of said friction clutch;

a blocking element attached to the pressure plate and having a detection section which, upon the occurrence of wear of said friction clutch, comes to rest against said stop and can deflect axially with respect to the pressure plate;

an arresting element, which is movable in a direction to arrest the detection section in an arrested position after it has deflected with respect to the pressure plate, said arresting element having a blocking section against which said take-up element can come to rest after shifting;

a pretensioning arrangement which urges said arresting element in said direction so that said blocking element remains in said arrested position; and a retaining arrangement which opposes further movement of said arresting element in said direction by frictionally engaging said arresting element while said detection section is in said arrested position, said pressure plate having a groove with a tapered cross-section in which said arresting element is wedged in a friction-locking manner when said detection section is in said arrested position.

7. A pressure plate assembly as in claim 6 wherein the blocking element has a body section, which acts as a leaf spring and is attached to the pressure plate, from which said detection section extends, which can come to rest against the stop.

* * * * *